March 3, 1959 T. R. WILLIS 2,876,353
THYRATRON BIASING CIRCUIT
Filed Oct. 25, 1956
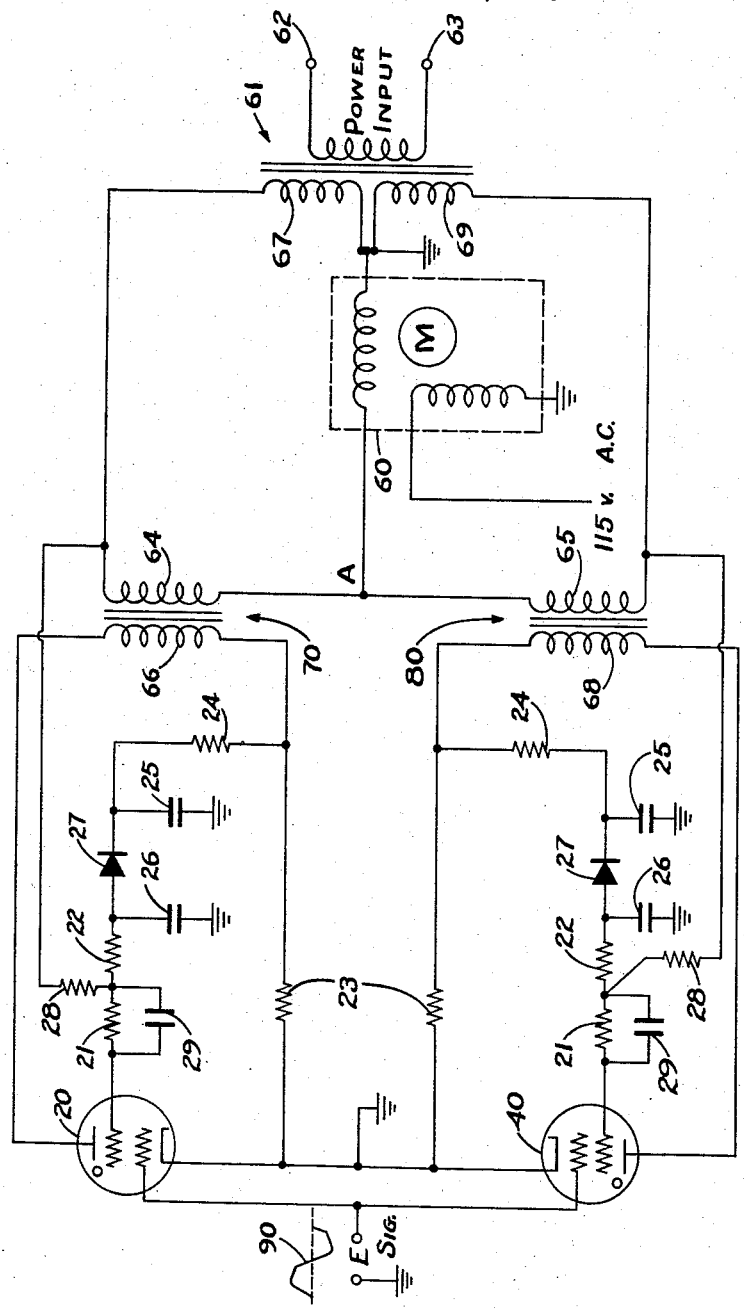
INVENTOR.
THEODORE R. WILLIS
BY Moody and Harsha
ATTORNEYS

United States Patent Office 2,876,353
Patented Mar. 3, 1959

2,876,353

THYRATRON BIASING CIRCUIT

Theodore R. Willis, Cedar Rapids, Iowa, assignor to Collins Radio Company, Cedar Rapids, Iowa, a corporation of Iowa Application October 25, 1956, Serial No. 618,304

4 Claims. (Cl. 250—27)

This invention relates to control systems utilizing gaseous type sustained discharge devices and more particularly to such systems where the firing points of the devices are uniformly controlled.

This invention is a novel control circuit (where the controlled device is normally a motor) where the static current balance in two halves of the circuit maintains the controlled device in a fixed position when no control signal is applied. This invention includes a novel usage of a gaseous type discharge device as control elements. This invention accurately controls the firing points of the discharge devices despite slow changes in the characteristics of the devices.

It is a feature of this invention that a control system using a push-pull arrangement of gaseous type discharge devices is continuously accurate regardless of tube characteristic variation. It is another feature of this invention that control of the quiescent state current flow in gaseous type discharge devices provides a more sensitive control system to the application of control signals.

It is an object of this invention to provide a simple bi-directional control circuit which is economical to construct, yet is extremely accurate. It is another object of this invention to provide a bi-directional control circuit which is responsive to changes in the firing point of gaseous type discharge devices.

It is yet another object of this invention to provide a novel control circuit where the quiescent state current of gaseous type discharge devices does not affect the operation of the devices as a control element. It is still another object of this invention to provide a novel control circuit including gaseous type discharge devices which accurately control a designated phase sensitive mechanism regardless of variations in the operational characteristics of the gaseous discharge devices.

These and other objects of this invention will become apparent when the following description is read in conjunction with the accompanying drawing, the single figure of which is a schematic diagram of one embodiment of this invention. In the embodiment of the invention shown in the figure, the gaseous discharge devices 20 and 40 are normally thyratrons. Each thyratron including a plate, a shield grid, a grid, and a cathode. The control system includes a controlled device 60 which is depicted as a two-phase servo motor. The controlled device 60 is connected through transformer 61 to a continuous power source which is connected to the leads 62 and 63. Thus, at all times there is a source of power available to operate the controlled device 60. The motor 60 is controlled in its operation by the flow of current through the thyratrons 20 and 40. The power input is an alternating current voltage and is applied simultaneously to the windings 64 and 65 of the transformers 70 and 80. Inasmuch as this voltage is applied to these transformers windings from opposite sides of the secondary windings 67 and 69 of the transformer 61, they will be 180 degrees out of phase with each other.

The control circuit may be considered as a balanced bridge type circuit. A simplified representation of this control circuit might show the thyratrons 20 and 40 as switching elements connected to a variable resistance. The conduction of the thyratron would be similar to the closing of the switch and a variation in resistance values decreasing as the conduction period increased.

The conduction or firing point of the thyratrons is governed by the control voltage 90 applied to the control grids of the individual thyratrons. This voltage is basically a square wave developed by a chopper and amplified. With the voltages applied across the transformers 70 and 80 and neither thyratron conducting a high impedance is reflected across each transformer and no net voltage appears across the controlled device 60. Now if the thyratron 20 is caused to conduct by the application a large amount of the control voltage 90, the impedance reflected into the secondary winding 66 of transformer 70 is the resistance of the thyratron 20 which decreases with conduction period. This impedance will be very much less than that reflected into the secondary winding 68 of transformer 80. Thyratron 20 fires and thyratron 40 does not fire due to the phasing of the plate voltages and the control voltage. If the control voltage reverses phase, the same cycle of events occurs in relation to thyratron 40. Consequently, almost the entire voltage from the transformer 61 is applied across the transformer 80. The voltage at point A and one side of the controlled device 60 will be nearly the same potential as the voltage at the extremity of secondary winding 67 of transformer 61. If this voltage is 90 degrees out of phase with the 115V supply voltage applied to the controlled unit, the motor will start to operate and its speed will be proportional to the thyratron conduction period. Conduction of the thyratron 40 will cause reversal of the direction of rotation of the motor due to the phase of the applied voltages.

A novel bias network is utilized with each thyratron to provide a special controlled starting voltage characteristic to the thyratron. This controlled starting voltage characteristic is necessary to enable the thyratron firing angle to be varied according to the amplitude of the input grid signal. The starting voltage conduction characteristic is obtained by applying a varying bias to the shield grid of the thyratron. The bias on the shield grid of thyratron 20 is a combination of three potentials: the direct current voltage developed across resistance 21 by the shield grid current, the alternating current voltage developed across resistance 22, and the direct current voltage developed across resistance 23 by the thyratron plate current. The bias system of this invention includes a shaping network for shaping the form of the bias signal on the shield grid of the thyratrons. The shaping network includes the alternating current feedback path through resistance 28 and the resistance capacitance network including resistance 21 and the capacitance 29. The shaping network also includes resistance 22 and the capacitance 26. It is the function of capacitance 26 with respect to the shaping network to provide essentially a short circuit to ground at the pertinent supply frequency. This shaping network shapes the firing characteristics of the thyratrons so that changes in the grid signal 90 result in proportional voltage changes at point A. The application of the bias developed across resistance 23 is delayed by the long time constant network including resistance 24, capacitances 25 and 26, and the high back impedance of the diode 27. This bias signal adjusts the firing characteristic of the thyratrons, i. e. it actually changes the position of the shaped bias signal on an absolute value scale. When the thyratron plate current stops due to the operation of control voltage, the bias developed on the shield grid is rapidly removed by the discharge of capacitance 26 through the forward resistance of the diode 27. If no signal is present on the control grid of the thyratrons, the novel bias circuit just described develops a self bias permitting small but equal quiescent plate currents to flow through both thyratrons regardless of tube variations. The long time constant prevents any substantial increase in bias through the application of a control signal of normal time duration. Balanced thyratron currents with zero control signal conditions are insured by the short time constant through the forward resistance of diode 27 returning the bias circuit to its normal bias quickly upon removal of any control grid signal.

Although this invention has been described with respect to a particular embodiment thereof, it is not to be so limited as changes and modifications may be made therein which are within the full intended scope of the invention, as defined by the appended claims.

What is claimed is:

1. A control circuit for controlling a phase sensitive device including a first transformer means, a second transformer means having a first and second winding, and a third transformer means having a first and second winding, said first windings of said second and said third transformer means connected to each other, said first transformer means having its primary winding connected to a source of alternating voltage and having a center tapped secondary winding, said phase sensitive device connected between said center tap and the mid point between the first winding of said second and said third transformer means, a second source of alternating current voltage connected in quadrature phase relationship to the voltages from said first windings to said phase sensitive device, control signals generated by an external source, a first and second gaseous discharge device each of said gaseous discharge devices connected across the second winding of said second and third transformer means, control means including a shaping means for shaping the firing characteristic curve of said gaseous discharge devices responsive to said control signals whereby said phase sensitive means is accurately controlled by the amount and phase of the voltage applied thereto.

2. A control circuit for controlling a phase sensitive device including a first transformer means, a second transformer means having a first and second winding, and a third transformer means having a first and second winding, said first windings of said second and said third transformer means connected to each other, said first transformer means having its primary winding connected to a source of alternating voltage and having a center tapped secondary winding, said phase sensitive device connected between said center tap and the mid point between the first winding of said second and said third transformer means, a second source of alternating current voltage connected in quadrature phase relationship to the voltages from said first windings to said phase sensitive device, control signals generated by an external source, a first and second gaseous discharge device, each of said gaseous discharge devices connected across the second winding of said second and third transformer means, control means including a shaping means for shaping the firing characteristic curve of said gaseous discharge devices, and means for adjusting the direct current level of said firing characteristic curve of said gaseous discharge devices whereby said phase sensitive means is accurately controlled as to speed and direction of rotation by said control signals.

3. A control circuit for controlling a phase sensitive device including a first transformer means, a second transformer means having a first and second winding, and a third transformer means having a first and a second winding, said first windings of said second and said third transformer means connected to each other, said first transformer means having its primary winding connected to a source of alternating voltage and having a center tapped secondary winding, said phase sensitive device connected between said center tap and the mid point between the first windings of said second and said third transformer means, a second source of alternating current voltage connected in quadrature phase relationship to the voltages from said first windings to said phase sensitive device, control signals generated by an external source, a first and second gaseous discharge device, each of said gaseous discharge devices individually connected across the second windings of said second and third transformer means, and control means including a shaping means comprising resistance and capacitance means connected to said gaseous discharge devices for shaping the firing characteristic curve of said gaseous discharge devices whereby said phase sensitive means is accurately controlled by the said control signals.

4. A control circuit for controlling a phase sensitive device including a first transformer means, a second transformer means having a first and second winding, and a third transformer means having a first and second winding, said first windings of said second and said third transformer means connected to each other, said first transformer means having its primary winding connected to a source of alternating voltage and having a center tapped secondary winding, said phase sensitive device connected between said center tap and the mid point between the first windings of said second and said third transformer means, a second source of alternating current voltage connected in quadrature phase relationship to the voltages from said first windings to said phase sensitive device, control signals generated by an external source, a first and second gaseous discharge device, each of said gaseous discharge devices individually connected across the second windings of said second and third transformer means, control means including a shaping means comprising resistance and capacitance means connected to said gaseous discharge devices for shaping the firing characteristic curve, and means for adjusting the direct current level of said firing characteristic of said gaseous discharge devices including resistance means, capacitance means and asymmetric impedance means connected to said gaseous discharge devices whereby said phase sensitive means is accurately controlled by said control signals.

References Cited in the file of this patent

UNITED STATES PATENTS

| | | |
|---|---|---|
| 2,476,849 | Ergen | July 19, 1949 |
| 2,508,640 | Kuhlemeier | May 23, 1950 |
| 2,710,368 | Wylie et al. | June 7, 1955 |
| 2,780,750 | Parsons | Feb. 5, 1957 |
| 2,786,134 | Shellhorn | Mar. 19, 1957 |

FOREIGN PATENTS

| | | |
|---|---|---|
| 608,049 | Great Britain | Sept. 9, 1948 |